US011159203B2

United States Patent
Baker et al.

(10) Patent No.: US 11,159,203 B2
(45) Date of Patent: Oct. 26, 2021

(54) PROCESS CONTROL LOOP BRIDGE

(71) Applicant: Micro Motion, Inc., Boulder, CO (US)

(72) Inventors: Walter Charles Baker, Victoria, MN (US); Marcos A V Peluso, Chanhassen, MN (US); Cheng Chua Vue, Blaine, MN (US); Randy Kenneth Paschke, Minneapolis, MN (US)

(73) Assignee: MICRO MOTION, INC., Boulder, CO (US)

( * ) Notice: Subject to any disclaimer, the term of this patent is extended or adjusted under 35 U.S.C. 154(b) by 35 days.

(21) Appl. No.: 16/587,595

(22) Filed: Sep. 30, 2019

(65) Prior Publication Data
US 2021/0083721 A1    Mar. 18, 2021

Related U.S. Application Data

(60) Provisional application No. 62/900,025, filed on Sep. 13, 2019.

(51) Int. Cl.
*H04B 3/50* (2006.01)
*H04B 3/02* (2006.01)
*G01D 3/08* (2006.01)

(52) U.S. Cl.
CPC ............. *H04B 3/50* (2013.01); *G01D 3/08* (2013.01); *H04B 3/02* (2013.01)

(58) Field of Classification Search
CPC .. G01D 3/08; G05B 19/0425; G05B 19/4185; G05B 2219/25191; H04B 3/50; H04B 3/02
USPC ........................................................ 375/258
See application file for complete search history.

(56) References Cited

U.S. PATENT DOCUMENTS

| 4,122,719 A | 10/1978 | Carlson et al. |
| 4,243,931 A | 1/1981 | dela Cruz |
| 4,413,314 A | 11/1983 | Slater et al. |
| 4,678,937 A | 7/1987 | Price |
| 4,910,658 A | 3/1990 | Dudash et al. |
| 4,936,690 A | 6/1990 | Goetzinger |
| 5,307,346 A | 4/1994 | Fieldhouse |
| 5,495,769 A | 3/1996 | Broden et al. |
| 5,551,053 A | 8/1996 | Nadolski et al. |
| 5,706,007 A | 1/1998 | Fragnito et al. |

(Continued)

FOREIGN PATENT DOCUMENTS

| DE | 297 20 492 | 3/1998 |
| EP | 0 601 344 | 6/1994 |

(Continued)

OTHER PUBLICATIONS

Hart Communication Bridge—Communication & Signal Processing Engineering, 1 pg., Aug. 8, 2019.

(Continued)

*Primary Examiner* — Leila Malek
(74) *Attorney, Agent, or Firm* — Westman, Champlin & Koehler, P.A.

(57) ABSTRACT

A bridge connected between a first process control loop and a second process control loop wherein the bridge allows alternating current digital signals to pass between the first process control loop and the second process control loop while preventing direct current analog signals from passing between the first process control loop and the second process control loop.

22 Claims, 5 Drawing Sheets

(56) References Cited

U.S. PATENT DOCUMENTS

| | | | |
|---|---|---|---|
| 5,713,668 | A | 2/1998 | Lunghofer et al. |
| 5,737,543 | A | 4/1998 | Gavin et al. |
| 5,803,604 | A | 9/1998 | Pompei |
| 5,825,664 | A | 10/1998 | Warrior et al. |
| 5,876,122 | A | 3/1999 | Eryurek |
| 5,980,078 | A | 11/1999 | Krivoshein et al. |
| 6,014,612 | A | 1/2000 | Larson et al. |
| 6,016,523 | A | 1/2000 | Zimmerman et al. |
| 6,026,352 | A | 2/2000 | Burns et al. |
| 6,035,240 | A | 3/2000 | Moorehead et al. |
| 6,047,222 | A | 4/2000 | Burns et al. |
| 6,052,655 | A | 4/2000 | Kobayashi et al. |
| 6,094,600 | A | 7/2000 | Sharpe, Jr. et al. |
| 6,104,875 | A | 8/2000 | Gallagher et al. |
| 6,192,281 | B1 | 2/2001 | Brown et al. |
| 6,574,515 | B1 | 6/2003 | Kirkpatrick et al. |
| 6,711,446 | B2 | 3/2004 | Kirkpatrick et al. |
| 6,961,624 | B2 | 11/2005 | Kirkpatrick et al. |
| 7,016,741 | B2 | 3/2006 | Arntson |
| 7,773,715 | B2 * | 8/2010 | Westfield ............... G01D 11/24 375/377 |
| 9,411,769 | B2 | 8/2016 | Erni et al. |
| 2002/0010518 | A1 | 1/2002 | Reid et al. |
| 2004/0190592 | A1 | 9/2004 | Lojen |

FOREIGN PATENT DOCUMENTS

| | | | |
|---|---|---|---|
| EP | 0 666 631 | | 8/1995 |
| EP | 1966566 A2 * | 9/2008 | ............ G08C 19/02 |
| GB | 2 329 039 | | 10/1999 |
| JP | 52-108194 | | 9/1977 |
| JP | 07162345 | | 6/1995 |
| JP | 5548266 B2 * | 7/2014 | ............ G01D 21/00 |
| JP | 6300950 B2 * | 3/2018 | ........... G05B 19/048 |
| WO | WO 2016/082840 | | 6/2016 |

OTHER PUBLICATIONS

Passive Transmitter Repeater DC 58-DRAGO Automation GmbH, 3 pgs., Aug. 8, 2019.
Passive Transmitter Repeater IS 58—Powering and Isolation of 2-wire Transmitters, ICS Schneider Messtechnik GmbH, 2 pgs.
9106A HART Transparent Repeater, Omni Instruments, 4 pgs., Aug. 8, 2019.
Advanced Systems Simplify Control, Machine Design, Penton, Inc., vol. 68, No. 12, pp. 118, 120, Jul. 11, 1996.
Observations of Third Party from European Patent Application No. 01933150.3, dated Feb. 19, 2004, 30 pgs.
Office Action from Chinese Patent Application No. 01809359.0, dated Apr. 23, 2004, 7 pgs.
Models 3144 and 3244MV Smart Temperature Transmitters, 00813-0100-4724, Rev. BB, Rosemount, Nov. 1998, 18 pgs.
Product Data Sheet, Model 848T Eight Input Temperature Transmitter with Foundation Fieldbus, 00813-0100-4697, Rev. CA, Mar. 2003, 14 pgs.
Smart Transmitter (HART Protocol) Interface Products, 1770 Communication Products, downloaded Apr. 26, 1999, 2 pgs. from http://www.ab.com/catalogs/html/b112/io/smart.html.
Product Data Sheet, Smart Head and Rail Mount Temperature Transmitters, Models 644H and 644R, 00813-0100-4728, Rosemount, 1998, 16 pgs.
Instruction Manual FD0-BI-Ex12.PA, English and German language document, Jan. 24, 2002, 24 pgs.
Universal Converter Analogue, Universal Temperature Multiplexer for Foundation Fieldbus, F2D0-Ti-Ex8.FF, 2003, 6 pgs.
ACEpc, Arcom Control Systems, dated Feb. 23, 2000, 1 page, from www.arcom.co.uk/products/icp/systems/ace/default.html.
EC-Type Examination Certificate PTB 98 ATEX 2210, German and English translation, Dec. 18, 1998, 15 pgs.
1st Amendment to EC-Type Examination Certificate PTB 98 ATEX 2210, German and English translation, Dec. 22, 1999, 8 pgs.
2. Supplement to EC-Type Examination Certificate PTB 98 ATEX 2210, German and English translation, Sep. 18, 2000, 2 pgs.
3. Supplement to EC-Type Examination Certificate PTB 98 ATEX 2210, German and English translation, Sep. 21, 2000, 4 pgs.
Valve Coupler for Foundation Fieldbus, Manual FDO-VC-Ex4.FF, Nov. 22, 2000, 48 pgs.
Transducer Interfacing Handbook, A Guide to Analog Signal Conditioning, by D. Sheingold, Mar. 1980, 8 pgs.
D5000 Series Users Manual, Revised Jan. 1, 1998, 23 pgs.
PLCs: Looking Around for More Work to Do, by M. Babb, Control Engineering, Oct. 1996, pp. 59, 60 and 62.
PROFIBUS-PA Valve Coupler Field Box, Model No. FD0-VC-Ex4.PA, 2002, IS Catalog, 1 page.
PROFIBUS-PA Sensor Interface Field Box, Model No. FD0-BI-Ex12.PA, 2002, IS Catalog, 1 page.
DP-Flow, Intelligent HART Gateway HG1 Plus, 2015, 10 pgs., from https://www.dp-flow.co.uk.
"Introduction to Capacitor", Electronics Hub, dated Nov. 28, 2015, URL: https://www.electronicshub.org/introduction-to-capacitors, retrieved Oct. 22, 2020, 31 pgs.
"HART Communication Application Guide", HART Communication Foundation, HCF_LIT-039 Rev. 7.1, dated Sep. 27, 2013, URL:https://www.fieldcommgroup.org/sites/default/files/technologies/hart/ApplicationGuide_r7.1.pdf, retrieved Oct. 20, 2020, 194 pgs.
Notification of Transmittal of the International Search Report and the Written Opinion of the International Searching Authority, or the Declaration from International Application No. PCT/US2020/047579, dated Nov. 11, 2020.

* cited by examiner

PROCESS CONTROL LOOP BRIDGE

CROSS-REFERENCE TO RELATED APPLICATION

The present application is based on and claims the benefit of U.S. provisional patent application Ser. No. 62/900,025, filed Sep. 13, 2019, the content of which is hereby incorporated by reference in its entirety.

BACKGROUND

In process control systems, a transmitter measures a process variable and transmits the value of the process variable to a host. In many systems, the transmitter is connected to the host by a two-wire loop. The value of the process variable can be transmitted as an analog signal by the transmitter by setting a DC current on the loop to a value that represents the value of the process variable. The DC current that can be applied to the loop is generally limited by a standard to a particular range such as 0-20 mA or 4-20 mA, for example.

Additional information can be transmitted on the loop using an alternating current signal superimposed on the DC current. This additional information is sent using a signal format supported by a protocol such as the HART protocol. One example of such signal formatting is Frequency Shift Keying where the digital signal is made up of two frequencies—1200 Hz and 2200 Hz—representing bits 1 and 0, respectively. Thus, by changing the frequency of the AC signal, digital values can be transmitted on top of the base 4-20 mA analog signal. In another example, Phase Shift Keying is used where the phase of the AC signal is changed to one of eight values, which each represent a respective 3-bit digital value.

There are generally two configurations for connecting transmitters to the host: point-to-point and multi-drop. In point-to-point, there is only a single transmitter on each loop. In such configurations, each transmitter is able to send values to the host using both the analog 4-20 mA signal and an AC digital signal but transmitters are not able to receive communications directly from other transmitters. In multi-drop, multiple transmitters are placed in parallel on the loop, which allows the transmitters to receive digital communications directly from each other. However, in such configurations, none of the transmitters on the loop can send data using the DC current signal because each transmitter is required to keep its DC current at 4 mA and the host does not measure the DC current on the loop. As a result, in multi-drop mode, the transmitters can only use the AC digital signal to convey information.

SUMMARY

A bridge is connected between a first process control loop and a second process control loop wherein the bridge allows alternating current digital signals to pass between the first process control loop and the second process control loop while preventing direct current analog signals from passing between the first process control loop and the second process control loop.

In accordance with a further embodiment, a process control transmitter includes a sensor for sensing an attribute of a fluid in a process control system, a communication interface configured to communicate with a host on a process control loop using a direct current analog signal and to send and receive alternating current digital signals, and a microprocessor. The microprocessor is configured to control a direct current analog signal set by the communication interface to provide a process variable to the host and the microprocessor is configured to send and receive digital values through the communication interface that are respectively received and sent by a second process control transmitter on a second process control loop and that are conveyed through a bridge for digital signals between the process control loop and the second process control loop.

In a still further embodiment, a terminal block includes a first terminal for receiving a transmitter segment of a first process control loop that is connected to a first process control transmitter and a second terminal for receiving a transmitter segment of a second process control loop that is connected to a second process control transmitter. A bridge circuit in the terminal connects the transmitter segment of the first process control loop to the transmitter segment of the second process control loop such that direct current analog signals are prevented from passing through the bridge circuit while alternating current digital signals pass through the bridge circuit.

DETAILED DESCRIPTION OF ILLUSTRATIVE EMBODIMENTS

Under current standards, there currently is no way to allow for direct communication between two transmitters while still allowing both transmitters to communicate with the host system via both analog (DC) and digital (AC) signals.

The embodiments provide a bridge to couple wired digital communication signals between devices on isolated analog current loop circuits, allowing the devices to individually communicate with host systems via analog Direct Current (DC) signals and digital Alternating Current (AC) signals and also communicate digitally with each other. The point-to-point analog DC current loops are individual and separated from each other. The point-to-point digital AC signals are individual, but the bridge allows the digital messages to be passed from one loop to another.

Figure 1:
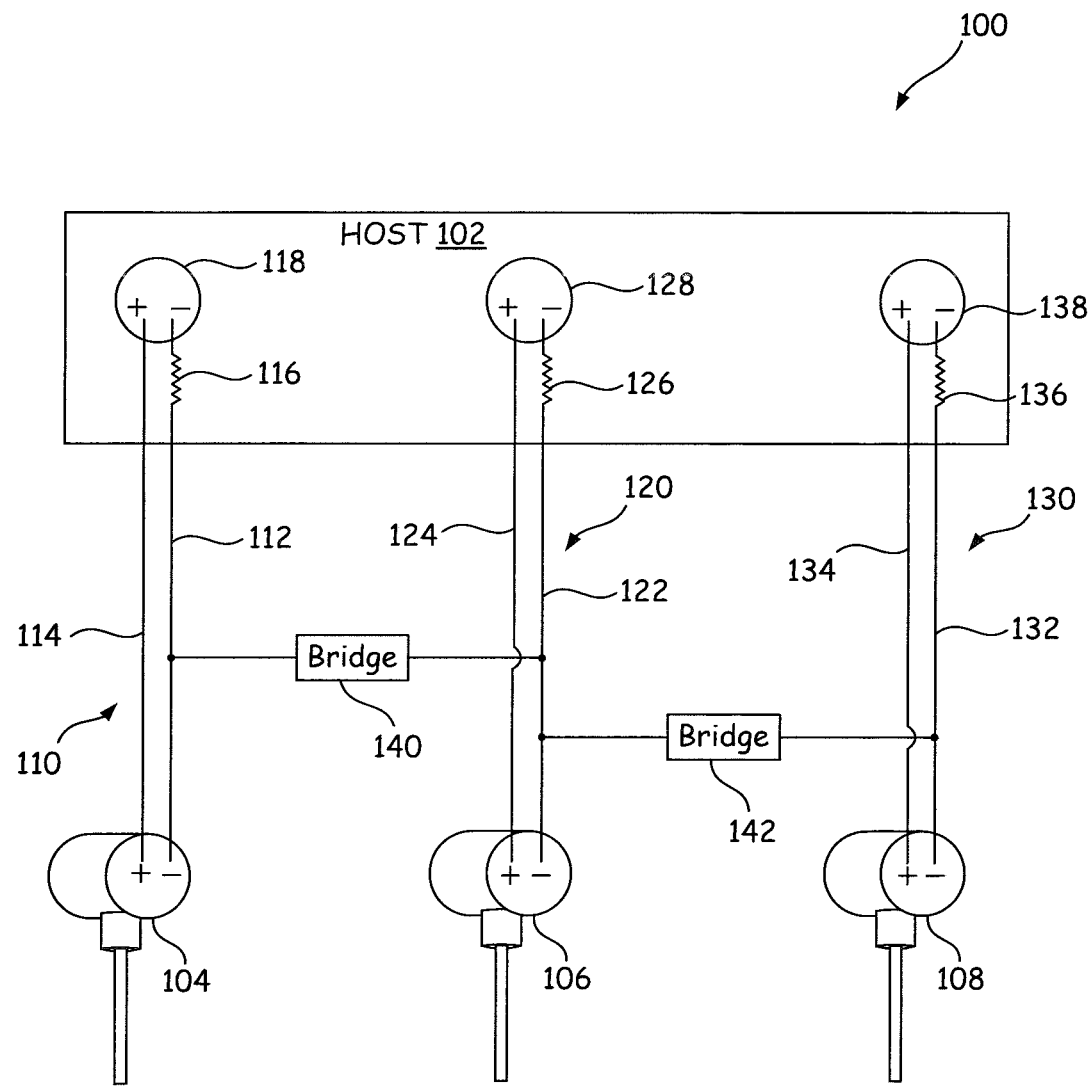
FIG. 1 provides a block diagram of a process control system in accordance with one embodiment.

FIG. 1 provides a block diagram of a process control system 100 having a host 102 and three process control transmitters 104, 106, and 108. Process control transmitter 104 is connected to host 102 by a two-wire process control loop 110 having a leg 112 and a leg 114. A sense resistor 116 is in series with leg 112 within or outside host 102 and host 102 applies a voltage 118 between an end of sense resistor 116 and leg 114. In embodiments where voltage 118 causes leg 114 to be at a higher voltage than leg 112, leg 114 is referred to as a positive leg and leg 112 is referred to as a negative leg. Process control transmitter 106 is connected to host 102 by a two-wire process control loop 120 having a leg 122 and a leg 124. A sense resistor 126 is in series with leg 122 within or outside host 102 and host 102 applies a voltage 128 between an end of sense resistor 126 and leg 124. In embodiments where voltage 128 causes leg 124 to be at a higher voltage than leg 122, leg 124 is referred to as a positive leg and leg 122 is referred to as a negative leg. Process control transmitter 108 is connected to host 102 by a two-wire process control loop 130 having a leg 132 and a leg 134. A sense resistor 136 is in series with leg 132 within or outside host 102 and host 102 applies a voltage 138 between an end of sense resistor 136 and leg 134, In embodiments where voltage 138 causes leg 134 to be at a higher voltage than leg 132, leg 134 is referred to as a positive leg and leg 132 is referred to as a negative leg.

Legs 112 and 122 are connected by a bridge 140 while legs 122 and 132 are connected by a bridge 142. Bridge 140 allows AC digital signals to pass between legs 112 and 122 but prevents DC analog signals from passing from process control loop 110 to process control loop 120 and vice versa. Bridge 142 allows AC digital signals to pass between legs 122 and 132 but prevents DC analog signals from passing from process control loop 120 to process control loop 130 and vice versa. The combination of bridges 140 and 142 allows AC digital signals to pass between legs 112 and 132 but prevents DC analog signals from passing between process control loops 110, 120 and 130.

Figure 2:
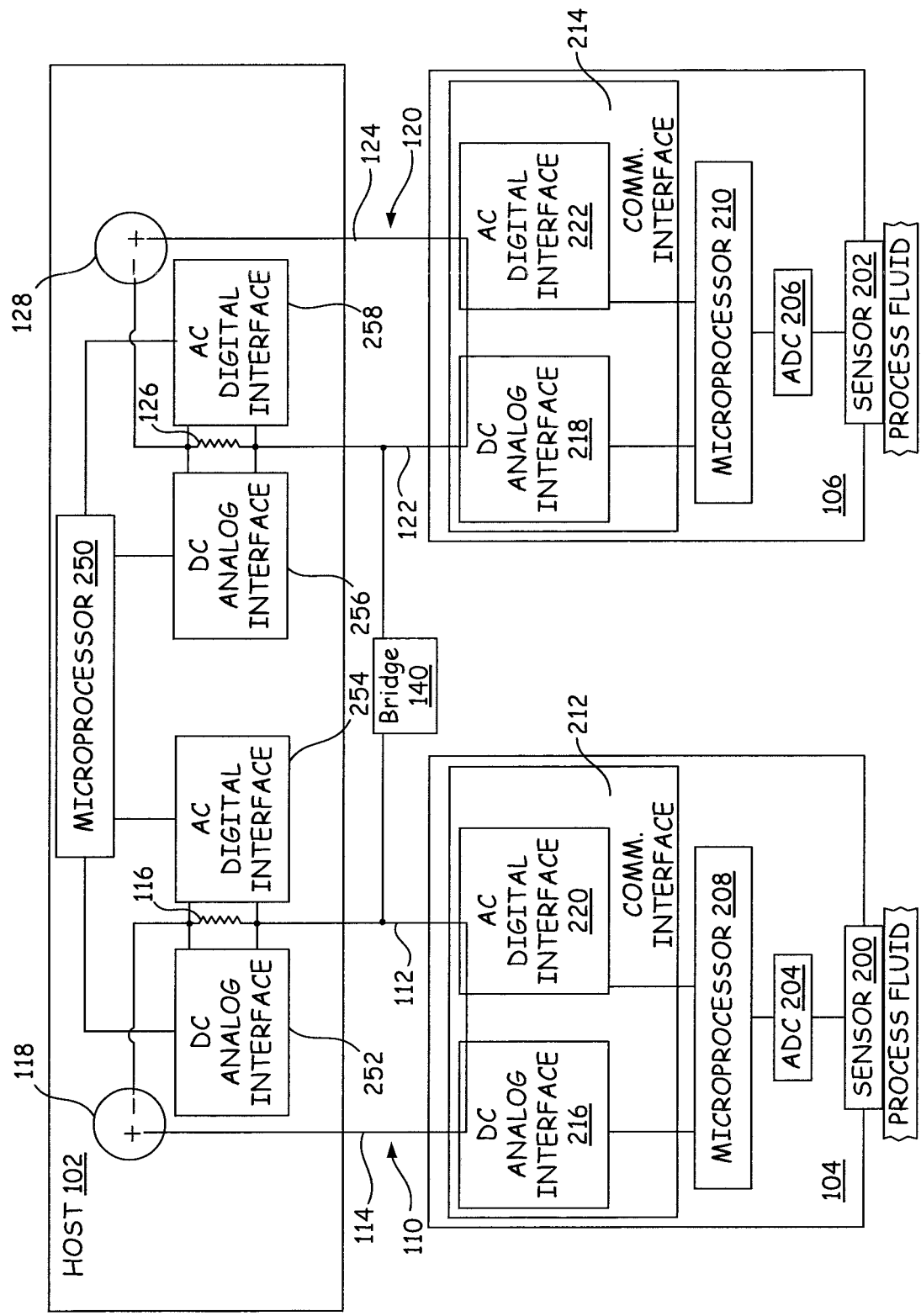
FIG. 2 provides a more detailed block diagram of a portion of the process control system of FIG. 1.

FIG. 2 provides a more detailed block diagram of process control transmitters 104 and 106 and host 102. Process control transmitter 104 includes a sensor 200, an analog-to-digital convertor 204, a microprocessor 208 and a communication interface 212 having a DC analog communication interface 216 and an AC digital communication interface 220. Process control transmitter 106 includes a sensor 202, an analog-to-digital convertor 206, a microprocessor 210 and a communication interface 214 having a DC analog communication interface 218 and an AC digital communication interface 222.

Sensors 200 and 202 sense a respective attribute of a process fluid in a process fluid conduit or tank. In some embodiments, sensors 200 and 202 sense the same attribute while in other embodiments sensors 200 and 202 sense different attributes. In some embodiments, sensors 200 and 202 sense attributes of the same process fluid while in other embodiments, sensors 200 and 202 sense attributes of different process fluids.

The analog signals produced by sensors 200 and 202 are provided to respective analog-to-digital convertors 204 and 206, which convert the analog signals into a series of digital values that are provided to respective microprocessors 208 and 210. In some embodiments, additional filtering is applied to one or more of the analog signal and the series of digital values.

Microprocessors 208 and 210 use the respective series of digital values to determine one or more values for a respective process variable. In accordance with some embodiments, the series of digital value is used directly as a series of values of the process variable while in other embodiments, the series of digital values are used to calculate values for the process variable.

Microprocessor 208 uses DC analog communication interface 216 to transmit the process variable values determined by microprocessor 208. DC analog communication interface 216 transmits the process variable values as a DC analog signal on process control loop 110. In accordance with one embodiment, the process variable values are transmitted by controlling a DC current on legs 112 and 114 so that the current has a value between 4 and 20 mA (or 0 and 20 mA) that represents the current value of the process variable. Microprocessor 210 uses DC analog communication interface 218 to transmit the process variable values determined by microprocessor 210. DC analog communication interface 218 transmits the process variable values as a DC analog signal on process control loop 120. In accordance with one embodiment, the process variable values are transmitted by controlling a DC current on legs 122 and 124 so that the current has a value between 4 and 20 mA that represents the current value of the process variable.

Microprocessor 208 uses AC digital communication interface 220 to transmit the process variable value determined by microprocessor 208 and/or additional digital information and to receive digital signals on process control loop 110. AC digital communication interface 220 transmits and receives the values and/or information as an AC digital signal on process control loop 110. In accordance with some embodiments, AC digital communication interface 220 transmits and receives the AC digital signals using Frequency Shift Keying, where the digital signal is made up of two frequencies—1200 Hz and 2200 Hz—representing bits 1 and 0, respectively. Thus, by changing the frequency of the AC signal on control loop 110, AC digital communication interface 220 is able to transmit digital values on top of the base 4-20 mA analog signal produced by DC analog communication interface 216. In other embodiments, AC digital communication interface 220 transmits and receives the AC digital signals using Phase Shift Keying, where the phase of the AC signal is changed to one of eight values, which each represent a respective 3-bit digital value. Thus, by changing the phase of the AC signal on control loop 110, AC digital communication interface 220 is able to transmit digital values on top of the base 4-20 mA analog signal produced by DC analog communication interface 216.

Microprocessor 210 uses AC digital communication interface 222 to transmit the process variable value determined by microprocessor 210 and/or additional digital information and to receive AC digital signals on process control loop 120. AC digital communication interface 222 transmits and receives the values and/or information as an AC digital signal on process control loop 120. In accordance with some embodiments, AC digital communication interface 222 transmits and receives the AC digital signals using Frequency Shift Keying, where the digital signal is made up of two frequencies—1200 Hz and 2200 Hz—representing bits 1 and 0, respectively. Thus, by changing the frequency of the AC signal on control loop 120, AC digital communication interface 222 is able to transmit digital values on top of the base 4-20 mA analog signal produced by DC analog communication interface 218. In other embodiments, AC digital communication interface 220 transmits and receives the AC digital signal using Phase Shift Keying, where the phase of the AC signal is changed to one of eight values, which each represent a respective 3-bit digital value. Thus, by changing the phase of the AC signal on control loop 120, AC digital communication interface 222 is able to transmit digital values on top of the base 4-20 mA analog signal produced by DC analog communication interface 218.

Host 102 includes one or more microprocessors 250 that communicate with a respective DC analog communication interface and a respective AC digital communication interface for each control loop connected to host 102. For example, for control loop 110, host 102 has DC analog communication interface 252 and AC digital communication interface 254 and for control loop 120, host 102 has DC analog communication interface 256 and AC digital communication interface 258.

DC analog communication interface 252 is connected across sense resistor 116 and uses the DC voltage across sense resistor 116 as a measure of the current on process control loop 110 and thus the value of the process variable. DC analog communication interface 256 is connected across sense resistor 126 and uses the DC voltage across sense resistor 126 as a measure of the current on process control loop 120 and thus the value of the process variable. DC analog communication interface 252 converts the measure of the current on process control loop 110 into a digital value and transmits the digital value to a microprocessor 250 and DC analog communication interface 256 converts the measure of the current on process control loop 120 into a digital value and transmits the digital value to microprocessor 250. Although DC analog communication interfaces 252 and 256 are shown communicating with a same microprocessor 250, in other embodiments, DC analog communication interfaces 252 and 256 communicate with separate microprocessors.

AC digital communication interface 254 is also shown connected across sense resistor 116 and uses the AC voltage across sense resistor 116 to determine digital values sent on control loop 110. For example, in some embodiments, AC digital communication interface 254 uses the frequency of the AC voltage to decode zeros and ones based on Frequency Key Shifting while in other embodiments, AC digital communication interface 254 uses the phase of the AC voltage to decode zeros and ones based on Phase Key Shifting. AC digital communication interface 258 is shown connected across sense resistor 126 and uses the AC voltage across sense resistor 126 to determine digital values sent on control loop 120. For example, in some embodiments, AC digital communication interface 258 uses the frequency of the AC voltage to decode zeros and ones based on Frequency Key Shifting while in other embodiments, AC digital communication interface 258 uses the phase of the AC voltage to decode zeros and ones based on Phase Key Shifting.

AC digital communication interface 254 is also able to transmit AC digital signals from microprocessor 250 on process control loop 110 by, for example, using Frequency Key Shifting or Phase Key Shifting. Similarly, AC digital communication interface 258 is able to transmit AC digital signals from microprocessor 250 on process control loop 120 by, for example, using Frequency Key Shifting or Phase Key Shifting.

Bridge 140 is connected between legs 112 and 122 of control loops 110 and 120. Bridge 140 prevents the DC analog signals produced by DC analog interfaces 216 and 218 from crossing between process control loops 110 and 120 while allowing the AC digital signals on process control loops 110 and 120 to cross between process control loops 110 and 120. Thus, AC digital signals produced by either AC digital communication interface 220 or 254 on loop 110 pass through bridge 140 so that the AC digital signals can be received by both AC digital communication interface 222 and AC digital communication interface 258 on process control loop 120. Similarly, AC digital signals produced by either AC digital communication interface 222 or 258 on control loop 120 pass through bridge 140 so that the AC digital signals can be received by both AC digital communication interface 220 and AC digital communication interface 254 on process control loop 110.

In accordance with one embodiment, AC digital communication interfaces 220, 222, 254 and 258 use the HART communication protocol when sending or receiving the AC digital signals. Under the HART protocol, communication is based on a request and reply structure where one device makes a request of another device and the other device replies. Devices that make requests are referred to as masters and devices that provide replies are referred to as slaves. There can be up to two master on a process control loop, a primary master and a secondary master. A request is a packet of digital values that includes an indication of whether the request is from the primary or the secondary master, an address of the slave device the request is addressed to, and an indication of what request is being made. A reply is a packet of digital values that includes the address of the slave device providing the reply, an indication of whether the reply is for the primary or secondary master, and the requested information or an error code. (Note that additional information can be present in both the request and the reply). The primary and secondary masters are able to request that a slave process control transmitter place itself in a burst mode where the slave periodically generates reply packets containing the process variable value sensed by the process control transmitter. Once place in burst mode, the process control transmitter continues to transmit the latest process variable value until instructed to stop by the master that sent the burst mode request.

In accordance with one implementation of the embodiment of FIG. 2, host 102 is the primary master, process control transmitter 104 is the secondary master and process control transmitter 106 is a slave. AC digital interface 220 of process control transmitter 104 is used to issue a request addressed to process control transmitter 106. Since the request packet is an AC digital signal, bridge 140 conveys the request packet from process control loop 110 to process control loop 120 so that it can be received by AC digital communication interface 222 and can be provided to microprocessor 210 of process control transmitter 106. In the request, process control transmitter 104 designates itself as the secondary master and instructs process control transmitter 106 to send a single reply packet containing process variable value(s) or to enter burst mode and send reply packets continuously with each replay packet containing the latest value for the process variable(s). If the request is for a single reply packet, microprocessor 210 instructs AC digital communication interface 222 to generate a single reply packet containing the requested process variable value(s). If the request is for transmitter 106 to enter burst mode, microprocessor 210 instructs AC digital communication interface 222 to generate the requested reply packet(s), which are broadcast on loop 120 so that AC digital communication interface 258 receives them. Since the reply packets are AC signals, the reply packets are conveyed across bridge 140 to process control loop 110 where the reply packets are received by AC digital communication interface 220 and are provided to microprocessor 208 and the reply packets are received by AC digital communication interface 254. In this way, process control transmitter 104 is able to receive the process variable values produced by process control transmitter 106 directly through bridge 140 without passing through host 102.

In other embodiments, process control transmitters 104 and 106 are slave devices and host 102 is the primary master. In such embodiments, process control transmitters 104 and 106 have different addresses. Host 102 sends a request to place process control transmitter 106 in burst mode. In response, microprocessor 210 instructs AC digital communication interface 222 of process control transmitter 106 to send AC digital reply packets containing the latest process variable value sensed by sensor 202. These reply packets are sent on process control loop 120 and are addressed to host 102. However, these reply packets also travel across bridge 140 to process control loop 110 where they are received by AC digital communication interface 220 of process control transmitter 104. Even though the reply packets are addressed to host 102, AC digital communication interface 220 decodes the AC signal and provides the digitized process variable values in the reply packet to microprocessor 208.

In accordance with one embodiment, microprocessor 208 uses the process variable values received from process control transmitter 106 and the process variable value from sensor 200 to calculate a further process variable value. For example, microprocessor 208 can use a pressure value from process control transmitter 106 and a differential pressure value (or any other volumetric flow value) from sensor 200 to calculate a mass flow rate. Microprocessor 208 then transmits the mass flow rate either as a DC analog signal or as an AC digital signal to host 102.

Figure 3:
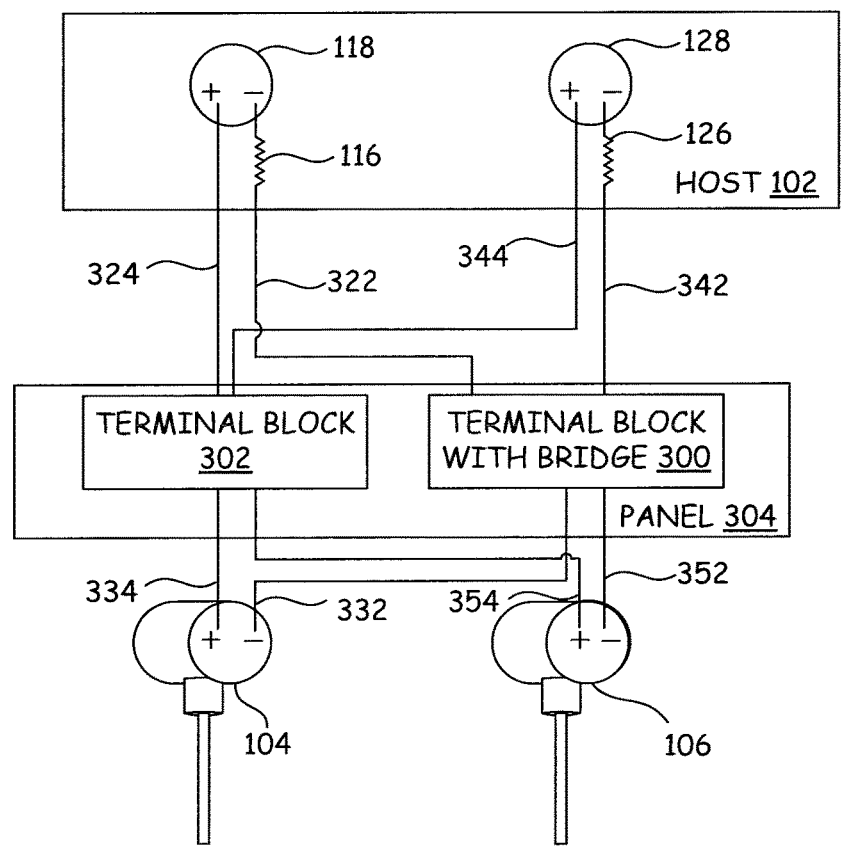
FIG. 3 provides a block diagram of a second embodiment.

FIG. 3 provides a schematic diagram of an embodiment in which bridge 140 is positioned within a terminal block 300 of panel 304. In some embodiments, panel 304 is a field junction panel while in other embodiments, panel 304 is a marshalling panel. In the embodiment of FIG. 3 each positive leg and each negative leg of each process control loop are divided into a host segment and a transmitter segment. For example, negative leg 112 of FIG. 1 is divided into host segment 322 and transmitter segment 332, positive leg 114 of FIG. 1 is divided into host segment 324 and transmitter segment 334, negative leg 122 of FIG. 1 is divided into host segment 342 and transmitter segment 352, and positive leg 124 of FIG. 1 is divided into host segment 344 and transmitter segment 354.

Within panel 304, terminal block 302 connects host and transmitter segments to form positive legs 114 and 124. Thus, terminal block 302 connects host segment 324 to transmitter segment 334 to form positive leg 114 and connects host segment 344 to transmitter segment 354 to form positive leg 124. Terminal block 300 connects host and transmitter segments to form negative legs 112 and 122 while also providing bridge 140 between negative legs 112 and 122. Thus, terminal block 300 connects host segment 322 to transmitter segment 332 to form negative leg 112 and connects host segment 342 to transmitter segment 352 to form negative leg 122. In addition, terminal block 300 includes circuit elements that allow AC digital signals to pass between negative leg 112 and negative leg 122 while preventing DC analog signals from passing between negative leg 112 and negative leg 122.

Figure 4:
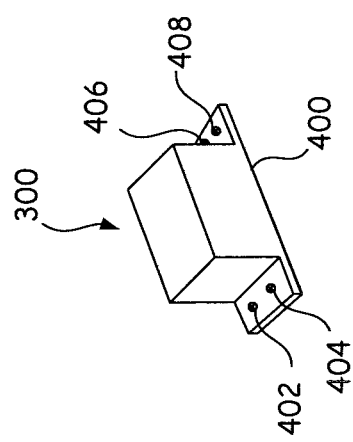
FIG. 4 provides a perspective view of a terminal block in accordance with one embodiment.

FIG. 4 provides a perspective view of terminal block 300 in accordance with one embodiment. Terminal block 300 includes a housing 400 and terminals 402, 404, 406 and 408 for respectively receiving transmitter segment 332, transmitter segment 352, host segment 322 and host segment 342. Bridge 140 is located within housing 400.

Figure 5:
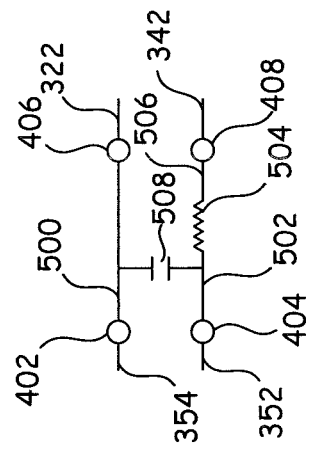
FIG. 5 provides a circuit diagram of the interior of a terminal block in accordance with one embodiment.

FIG. 5 provides a circuit diagram of the internal wiring of terminal block 300 in accordance with one embodiment. In FIG. 5, a conductor 500 extends from terminal 402 to terminal 406 to connect terminal segment 332 to host segment 322. A conductor 502, a resistor 504 and a conductor 506 extend in series from terminal 404 to terminal 408 to connect transmitter segment 352 to host segment 342. A capacitor 508 extends between conductor 500 to conductor 502. Capacitor 508 and resistor 504 form bridge 140, which allows AC signals to pass between negative legs 112 and 122 while preventing DC signals from passing between negative legs 112 and 122.

Figure 6:
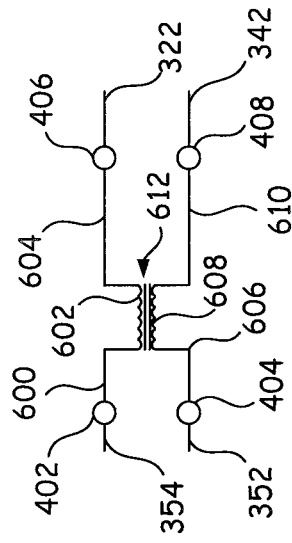
FIG. 6 provides a circuit diagram of the interior of a terminal block in accordance with a second embodiment.

FIG. 6 provides a circuit diagram of the internal wiring of terminal block 300 in accordance with a second embodiment. In FIG. 6, a conductor 600, a winding 602 of a transformer 612, and a conductor 604 extend in series from terminal 402 to terminal 406 to connect transmitter segment 332 to host segment 322. A conductor 606, a second winding 608 of transformer 612 and a conductor 610 extend in series from terminal 404 to terminal 408 to connect transmitter segment 352 to host segment 342. Transformer 612 forms bridge 140 and allows AC digital signals to pass between negative legs 112 and 122 while preventing DC analog signals from passing between negative legs 112 and 122. In addition, transformer 612 allows negative legs 112 and 122 to be at different ground planes without affecting communication on control loops 110 and 120.

In other embodiments, active circuit elements are used in bridge 140 to allow the AC digital signals to pass between the loops while preventing the DC analog signals from passing between the loops. In the simple case, additional components may be added to help balance the signal levels between the respective HART loops.

Figure 7:
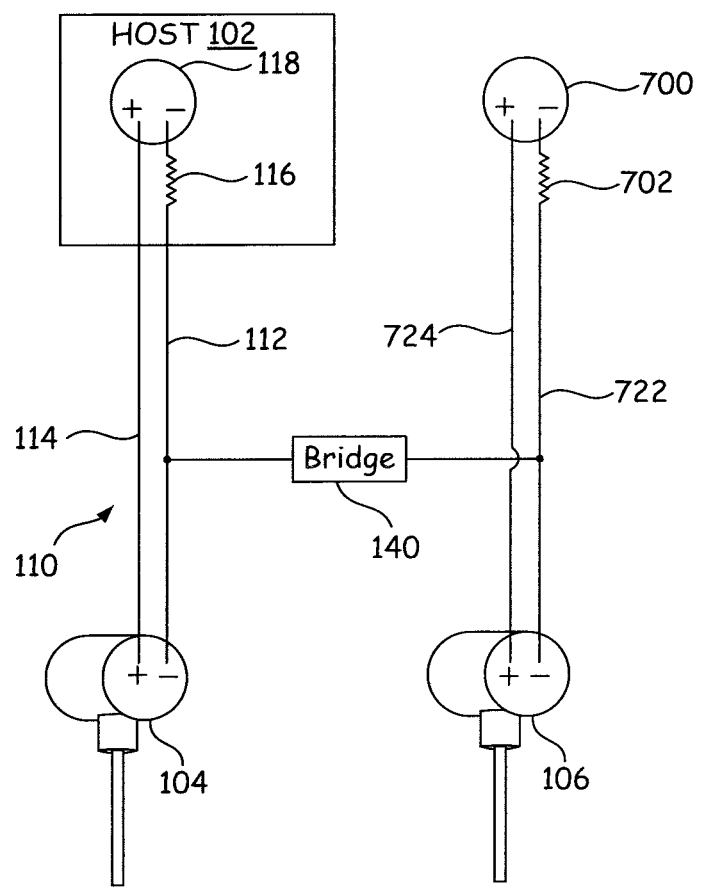
FIG. 7 provides a block diagram of a process control system in accordance with a second embodiment.

FIG. 7 provides a block diagram of a further embodiment of a process control system in which there is no process control loop between process control transmitter 106 and host 102. Instead, a power source 700 that is separate from host 102 is provided that generates a voltage for process control transmitter 106 similar to voltage 128 and includes current protection in case of a short. In addition, a load resistor 702 with a same resistance as sense resistor 126 is connected in series between the negative lead of power source 700 and the negative lead of process control transmitter 106 by a negative leg 722. A positive leg 724 connects the positive lead of power source 700 to the positive lead of process control transmitter 106. Negative leg 722 is connected to bridge 140, which allows AC digital signals to pass between negative leg 722 and negative leg 112 of process control loop 110. As such, process control transmitter 106 is able to send and receive AC digital signals to and from process control transmitter 104 and host 102 through bridge 140. In accordance with one embodiment, load resistor 702 is located within a terminal block that includes bridge 140.

Any types of process control transmitters can be used with the various embodiments.

Although individual embodiments are discussed separately above, those skilled in the art will recognize that such embodiments can be used together. Although the present invention has been described with reference to preferred embodiments, workers skilled in the art will recognize that changes may be made in form and detail without departing from the spirit and scope of the invention.

What is claimed is:

1. A bridge comprising:
   a first connection configured to connect to a first process control loop;
   a second connection configured to connect to a second process control loop; and
   bridge circuitry configured to allow alternating current digital signals to pass between the first process control loop and the second process control loop while preventing direct current analog signals from passing between the first process control loop and the second process control loop.

2. The bridge of claim 1 wherein the bridge circuitry is connected between one leg of the first process control loop and one leg of the second process control loop.

3. The bridge of claim 2 wherein the bridge circuitry comprises a capacitor connected to the one leg of the first process control loop and to the one leg of the second process control loop.

4. The bridge of claim 2 wherein the bridge circuitry comprises a transformer connected to the one leg of the first process control loop and to the one leg of the second process control loop.

5. The bridge of claim 1 wherein the bridge circuitry is located within a terminal block.

6. The bridge of claim 1 wherein a first process control transmitter is connected to the first process control loop and a second process control transmitter is connected to the second process control loop and wherein the first process control transmitter communicates directly with the second process control transmitter across the bridge.

7. The bridge of claim 6 wherein the first process control loop and the second process control loop are connected to a host.

8. The bridge of claim 7 wherein the host acts as a primary master and the first process control transmitter acts as a secondary master.

9. The bridge of claim 7 wherein the host acts as a primary master and the first process control transmitter and the second process control transmitter act as slaves.

10. The bridge of claim 1 wherein the bridge circuitry comprises at least one active element.

11. A process control transmitter comprising:
a sensor configured to sense an attribute of a fluid in a process control system;
a communication interface configured to communicate with a host on a process control loop using a direct current analog signal and to receive alternating current digital signals; and
a microprocessor, wherein the microprocessor is configured to control the direct current analog signal set by the communication interface to provide a process variable to the host and wherein the microprocessor is configured to receive digital values through the communication interface that are sent by a second process control transmitter on a second process control loop and are conveyed to the process control loop through a bridge for digital signals between the process control loop and the second process control loop.

12. The process control transmitter of claim 11 wherein the microprocessor is configured to receive the digital values by decoding digital signals sent to the host on the second process control loop by the second process control transmitter.

13. The process control transmitter of claim 11 wherein the microprocessor is further configured to send digital packets through the communication interface to the second process control transmitter across the bridge.

14. The process control transmitter of claim 13 wherein the microprocessor is further configured to designate the process control transmitter as a secondary master in the digital packets.

15. The process control transmitter of claim 14 wherein at least one of the digital packets instructs the second process control transmitter to enter a burst mode.

16. The process control transmitter of claim 11 wherein the microprocessor is further configured to receive digital values through the communication interface that are sent by a third process control transmitter on a third process control loop and are conveyed to the process control loop through a second bridge for digital signals between the process control loop and the third process control loop.

17. A terminal block comprising:
a first terminal for receiving a transmitter segment of a first process control loop that is connected to a first process control transmitter;
a second terminal for receiving a transmitter segment of a second process control loop that is connected to a second process control transmitter; and
a bridge circuit connecting the transmitter segment of the first process control loop to the transmitter segment of the second process control loop such that direct current analog signals are prevented from passing through the bridge circuit while alternating current digital signals pass through the bridge circuit.

18. The terminal block of claim 17 wherein the bridge circuit comprises a capacitor.

19. The terminal block of claim 18 further comprising:
a third terminal for receiving a host segment of the first process control loop that is connected to a host; and
a fourth terminal for receiving a host segment of the second process control loop that is connected to the host.

20. The terminal block of claim 19 wherein the capacitor is positioned between the first terminal and the second terminal and the bridge further comprises a resistor positioned between the first terminal and the third terminal.

21. The terminal block of claim 17 wherein the bridge circuit comprises a transformer.

22. The terminal block of claim 21 further comprising:
a third terminal for receiving a host segment of the first process control loop that is connected to a host; and
a fourth terminal for receiving a host segment of the second process control loop that is connected to the host.

* * * * *